United States Patent Office 2,920,102
Patented Jan. 5, 1960

---

2,920,102

PREPARATION OF β-ACETYLVINYL ESTERS

Theodore E. Bockstahler, Moorestown, N.J., and Benjamin F. Aycock, Wyncote, and Andrew Carson, Philadelphia, Pa., assignors to Rohm & Haas Company, Philadelphia, Pa., a corporation of Delaware No Drawing. Application November 6, 1957
Serial No. 694,715

15 Claims. (Cl. 260—488)

This invention is concerned with unsaturated ketones which are esters of hydroxymethylene ketones. More particularly, this invention relates to a novel class of compounds which may be represented by the generic formula $$CH_3COCH=CHOCO-R$$

where R is a straight or branched-chain alkyl group containing from 1 to 4 carbon atoms. Typical groups are: methyl, ethyl, butyl, isopropyl, propyl, isobutyl, and the like. This invention also relates to a preparation of these compounds.

Illustrative of the compounds of the present invention, there may be named: β-acetylvinyl acetate, O-acetylvinyl propionate, β-acetylvinyl n-butyrate, β-acetylvinyl n-valerate, β-acetylvinyl isovalerate, and β-acetylvinyl isobutyrate.

The novel compounds of this invention are valuable chemical intermediates. They may be reacted in Diels-Alder type reactions with appropriate dienes. For instance, they may form the acetate of acetylcyclohexen-ol. These adducts may be dehydrogenated to form the aromatic derivatives. The compounds of this invention also are monomers that may be copolymerized with other monomers having a vinylidene group such as styrene, methyl methacrylate, methyl acrylate, and the like.

The instant ketones are also very useful in the preparation of triacetylbenzene for which they are a primary starting material. Triacetylbenzene itself may be reacted with sodium hypochlorite to yield trimesic acid, or it may be treated to yield triallyl trimesate and trivinyl benzene. The instant novel class of esters may also find useful applications in the synthesis of pharmaceuticals. Moreover, the compounds of this invention are effective pesticides, particularly effective fungicides, that are useful in preparing valuable pesticidal compositions for agricultural applications.

We have discovered that the novel compounds of this invention may be prepared by effecting the reaction between a particular salt of formyl acetone and an acid anhydride or an acyl halide, preferably under anhydrous conditions in the presence of an inert organic solvent. The reaction proceeds readily and efficiently. It may be described as an acylation of a metallic derivative of formyl acetone which is effectuated by the substitution of the metallic component of said derivative by an acyl group, RCO—, where R is defined as an alkyl group, straight or branched, containing from 1 to 4 carbon atoms. Alternatively, the acylation may be considered as the replacement of the metallic component of the metallic derivative of formyl acetone by the positive portion of the acylating agent with formation of an insoluble salt of the negative portion of the acylating agent with the metallic component of the metallic derivative of formyl ketone. For instance, in acetyl chloride, the negative portion is the chlorine portion of the molecule, and the positive portion is

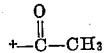

The insoluble salts are preferably separated out.

The metallic derivatives of formyl acetone that may be employed in the present invention are salts of formyl acetone. Herein, the term "salt" is generic to and refers to both the salt form and to polyvalent salts which may form salt-chelate complexes with formyl acetone. These metallic derivatives of formyl acetone may be represented by the following generic formula $$CH_3COCH=CHOM$$

where M is a metal. Generally useful metals are alkaline metal salts of an atomic number from 3 to 19, inclusive, in group IA of the periodic chart of the elements including lithium, sodium, and potassium; polyvalent metals having an atomic number from 22 to 30, including titanium, vanadium, chromium, manganese, copper, zinc, iron, cobalt, and nickel—the latter three in group VIII of the periodic chart; and the salts of atomic number from 13 to 14 inclusive, including aluminum and silicon. The alkaline metal salts are preferred because of availability and convenience. The chelate-forming metals of formyl acetate may advantageously be used when it may be desired to achieve increased solubility in the solvent in connection with which these salts are employed.

In accordance with a preferred aspect of our process, a salt of formyl acetone is reacted, in the presence of an inert organic solvent, by intimately contacting with an organic acylating agent, the negative portion of which forms an insoluble salt with the specified metal of the formyl acetone. The particular acylating agents that yield the products of our invention have a carbon content from 2 to 10 carbon atoms and may be divided into acyl halides and acid anhydrides. In accordance with this invention, the term acylating agent excludes ketenes and in contrast to ketenes which under the conditions of this invention are addition acylating agents and hence would not form insoluble salts the acylating agents of the present invention are displacement or substitution acylating agents which form an insoluble salt which may be separated from the product of the reaction. These acylating agents are further characterized by containing from 1 to 2 carbonyl groups but as being free of an adjoining methylene carbonyl group such as occurs in ketenes.

The acylating acyl halides and/or acid anhydrides that may be employed to react with the specified salts of formyl acetone may be represented by the following generic formula $$(RCO)—X—(RCO)_{n-1}$$

where R is an alkyl group containing from 1 to 4 carbon atoms, $n$ represents an integer from 1 to 2 inclusive, X represents an oxygen atom or Y, and Y represents a halogen atom of an atomic number from 17 to 53 inclusive, and with the proviso that when $n$ is equal to 1 then X represents Y and when $n$ is equal to 2 the X is an oxygen atom.

Typical alkyl groups are methyl, ethyl, propyl isopropyl, butyl, isobutyl, and sec-butyl. Halogen atoms of atomic number from 17 to 53 include chlorine, bromine, and iodine.

Typical acid anhydrides that may be employed to react with salts of formyl acetone include acetic anhydride, propionic anhydride, n-butyric anhydride, n-valeric anhydride, isobutyric anhydride, and valeric anhydride. Typical acetyl halides that may be used include: acetyl chloride, acetyl bromide, propionyl chloride, acetyl iodide; isobutyryl chloride, propionyl iodide, n-butyryl chloride, butyryl bromide, n-valeryl chloride, and isobutyryl chloride.

Amongst the acid anhydrides and acetyl halides, acetic anhydride and acetyl chloride are now preferred. Acetyl fluoride is less desirable because of its undue reactivity. If desired, there may be used mixtures of acyl halides or of acid anhydrides or mixtures of the anhydrides with the halides.

Since the salts of formyl acetone that are employed in the present invention are generally solids, it is preferable to use a vehicle to promote their reaction with the defined acylating agents. It is preferred to employ an anhydrous, inert, volatile, organic solvent, especially of the nonpolar type. The presence of a solvent facilitates the removal of the β-acetylvinyl esters from the solid salt byproduct formed during the reaction. The solvent is easily removed, when desired, by distillation or other appropriate means. Suitable solvents are benzene, toluene, methylene dichloride, xylene, chloroform, dry ether, or hydrocarbon solvents such as naphtha, hexane, pentane and mixtures of these solvents. A minimum of inert solvent is used and by this is meant an amount of solvent sufficient to provide a convenient total volume, and it usually signifies an amount of solvent from 1 to 5 times the weight of salt of formyl acetone used. Ordinarily, there may be prepared a dispersion of the salts of formyl acetone but increased solubility in the solvent may be obtained with the chelate-forming metal derivatives.

The instant reaction is usually exothermic and vigorous. Hence, it may be preferable, particularly in the early stages of the reaction to employ convenient methods, such as an ice bath, for cooling the reaction system and to maintain a convenient reaction speed. Such cooling is specially advantageous when low boiling acylating agents are employed. Also, it is frequently convenient to add the anhydride or halide slowly to the salt of formyl acetone in order to minimize somewhat the undesirable effects of the exothermic nature of the reaction. The exothermic nature of the reaction permits convenient determination of its progress. When the exotherm levels off it is generally an indication that the reaction between the acylating agent and the formyl acetone salt is substantially complete. This is generally achieved in about 2 to 4 hours, somewhat longer periods of time being required for the lesser reactive acylating agents. If desired, to insure completeness of the reaction, there may be carried out additional mixing and/or mild heating in the range of about 30° to about 50° C., for a convenient period of time, such as an additional period of 5 to 20 hours.

Temperatures in the range of about 10° C. to about 65° C. are advantageously employed. Usually temperatures in the range of about 30° to about 50° C. are somewhat preferred. At temperatures below 10° C., the reaction rate is undesirably slow while at temperatures exceeding 60° C. reduced yields may be obtained.

Atmospheric pressures are usually employed. However, if desired, subatmospheric or superatmospheric pressures may satisfactorily be used, particularly if the properties of the contemplated acylating reagent and reaction temperatures suggest such conditions.

The present reaction is essentially an equimolecular one. It is generally the practice to employ stoichiometric amounts, and advantageously to employ about 2 to 7% less than stoichiometric of the particular acylating agent than of the formyl acetone salt. At the completion of the reaction the solid salt is separated from the liquid product by any convenient means, such as filtration. The collected solid may be washed to insure complete removal of product. The liquid product is preferably isolated by distillation at pressures conveniently less than atmospheric. The products of this invention are colorless or slightly yellowish liquids which are valuable in various applications and as chemical intermediates as illustrated above.

The following examples illustrate the type of compounds of this invention and their preparation. All parts are by weight.

*Example 1*

A sodium salt of formyl acetone (SFA) 216 parts (2.0 moles), and 1 liter of anhydrous ether are charged to a 3-necked, 2-liter flask equipped with an efficient stirrer. Acetic anhydride, a total of 193.6 parts (1.90 moles), is added while vigorously stirring. Heat evolves, and the temperature of the reactants is maintained within the range of 30° to 40° C. by immersing the reaction flask in a cooling bath. Agitation and mixing are continued. After 3½ hours as the heat of the reaction evolved levels off no further cooling is required. The reaction is substantially complete. Additional stirring is continued for 17 hours at 30° C. The mixture of solvent, slurry of sodium acetate, and product is filtered. The resulting filter cake is slurried in fresh ether and again is filtered. The filtrates from both filtrations are combined, then concentrated by stripping the ether through a 2-foot helix packed column. The concentrate is β-acetylvinyl acetate. It is distilled under full aspirator vacuum (15 mm.) through a Claisen-type apparatus with steam-bath heating. The product, β-acetylvinyl acetate is collected in over 90% yields based on pure SFA. It is found to have a boiling range of 60° to 61° C. at 0.4 mm. of mercury, and the index of refraction is $N_D^{25}=1.4553$. Spectroscopic data confirms the structure.

*Example 2*

Following the same general procedure as in Example 1, there is reacted the potassium salt of formyl acetone with acetic anhydride in anhydrous ether. When the reaction is terminated, potassium acetate and some unreacted potassium formyl acetone are filtered off. β-Acetylvinyl acetate is obtained in satisfactory yield. A lithium salt of formyl acetone may be reacted in the same manner.

*Example 3*

SFA, 216 parts, and 1 liter of anhydrous benzene are charged to a 2-liter, round-bottom, 3-necked flask fitted with cooling coils and a mechanical stirrer. The mixture is stirred while a total of 149 parts of acetyl chloride is gradually added through a dropping funnel. As the exotherm of the reaction raises the temperature to about 55° C., cooling is applied to maintain the temperature within the range of 30° to 40° C. Stirring is continued. After about 4 hours, cooling is discontinued and the temperature is allowed to raise to about 50° C. After 1 hour, the temperature drops to room temperature indicating that the reaction is substantially complete. Stirring is continued for another 2 hours to insure completeness of the reaction. The slurry is separated from solvent, and β-acetylvinyl acetate is removed. The collected filter cake, essentially sodium chloride, is washed twice with anhydrous benzene and the washings are added to the first filtrate. The combined filtrates are concentrated by stripping off the benzene. The β-acetylvinyl acetate is collected by distillation under 15 mm. vacuum. It has a boiling point range of 60° to 61° C. at 0.4 mm. of mercury.

When in the above example benzene is substituted by xylene, toluene, ether, hexane, or naphtha, the reaction is carried out satisfactorily. Mixtures of various anhydrides and/or of various acyl halides may be employed, there being taken into consideration their respective ease of reaction with the particular formyl acetone salt.

*Example 4*

In a similar manner as in Example 3, there are reacted 120 parts of isovaleryl chloride and SFA in toluene. β-Acetylvinyl isovalerate is collected as a product.

From the anhydride of isovaleric acid the same product is obtained.

Example 5

A chelated copper salt of formyl acetone is prepared by adding 27 parts of SFA to an aqueous solution of cupric ion. The blue chelate containing two formyl acetone molecules per atom of copper is extracted with portions of chloroform and diluted to a volume of one-half liter. After drying over sodium sulfate, the chloroform solution of chelate is treated with 20 parts of acetyl chloride, β-acetylvinyl acetate and cupric chloride being produced. The ester may be distilled after removal of the copper salt.

Example 6

Propionyl chloride, 84 parts, is added gradually over a period of 1 hour to 108 parts of SFA in 1 liter of benzene. Active stirring is maintained and cooling is applied when necessary to maintain the temperature below about 50° C. After 5 hours, heating is applied to maintain about 30° C. and the reactants are stirred overnight (8 hours). After that time, the flask is cooled and solid material is filtered out. β-Acetylvinyl propionate is separated in the manner described above. Propionyl bromide is reacted in a similar manner.

β-Acetylvinyl propionate is obtained in a like manner from propionic anhydride.

Example 7

To 54 parts of the sodium salt of formyl acetone dispersed in dry ether, there is added over a period of one-half hour 57 parts of isovaleryl chloride. When the exotherm subsides reflux is maintained for 4 additional hours by heating on a steam bath. The mixture is then cooled, and salts are filtered off. The desired ester, β-acetylvinyl isovalerate, is isolated in good yield by stripping off the solvent and then distilling the residue under reduced pressure.

In a similar manner, there is obtained β-acetylvinyl isovalerate from isovaleryl anhydride.

We claim:
1. A process for preparing compounds of the general formula

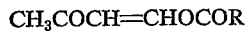
$$CH_3COCH=CHOCOR$$

in which R is an alkyl group containing from 1 to 4 carbon atoms which comprises acylating, under substantially anhydrous conditions and in the presence of an inert organic solvent, by intimately contacting a metallic derivative of formyl acetone of the formula

$$CH_3COCH=CHOM$$

where M is a metal, with a compound containing from 2 to 10 carbon atoms and having the general formula of

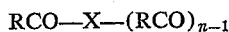
$$RCO—X—(RCO)_{n-1}$$

where R is an alkyl group containing from 1 to 4 carbon atoms, n represents an integer from 1 to 2, inclusive, X is selected from the group consisting of an oxygen atom and Y, and Y represents a halogen atom of an atomic number from 17 to 53 inclusive, where n is equal to 1 when X represents Y and where n is equal to 2 when X is an oxygen atom.

2. The process of claim 1 in which M is a chelating metal having an atomic number from 25 to 29.

3. The process of claim 1 wherein M is an alkaline metal of an atomic number from 3 to 19.

4. The process of claim 3 wherein the metal is sodium.

5. The process of claim 3 wherein the metal is potassium.

6. The process of claim 3 in which the reaction is carried out below 60° C.

7. A process for preparing compounds of the general formula

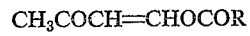
$$CH_3COCH=CHOCOR$$

in which R is an alkyl group containing from 1 to 4 carbon atoms which comprises acylating, under substantially anhydrous conditions and in the presence of an inert organic solvent, by intimately contacting a metallic derivative of formyl acetone of the formula

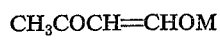
$$CH_3COCH=CHOM$$

where M is a metal, with an acid anhydride having the general formula

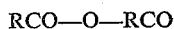
$$RCO—O—RCO$$

where R is an alkyl group containing from 1 to 4 carbon atoms.

8. The process of claim 7 in which R is methyl.

9. A process for preparing compounds of the general formula

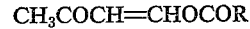
$$CH_3COCH=CHOCOR$$

in which R is an alkyl group containing from 1 to 4 carbon atoms which comprises acylating, under substantially anhydrous conditions and in the presence of an inert organic solvent, by intimately contacting a metallic derivative of formyl acetone of the formula

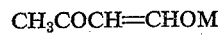
$$CH_3COCH=CHOM$$

where M is a metal, with an acyl halide having the general formula

$$RCO—Y$$

where Y represents a halogen atom of an atomic number from 17 to 35, inclusive, and R is an alkyl group containing from 1 to 4 carbon atoms.

10. The process of claim 9 in which Y represents chlorine.

11. The process of claim 9 in which R is methyl.

12. A process for preparing β-acetylvinyl acetate which comprises intimately contacting under substantially anhydrous conditions and in the presence of an inert solvent, sodium formyl acetone with acetic anhydride.

13. A process for preparing β-acetylvinyl acetate which comprises intimately contacting under substantially anhydrous conditions and in the presence of an inert solvent, sodium formyl acetone with acetyl chloride.

14. A process for preparing β-acetylvinyl propionate which comprises intimately contacting under substantially anhydrous conditions and in the presence of an inert solvent, sodium formyl acetone with propionic anhydride.

15. A process for preparing β-acetylvinyl propionate which comprises intimately contacting under substantially anhydrous conditions and in the presence of an inert solvent, sodium formyl acetone with propionyl chloride.

References Cited in the file of this patent

Claisen: Ber. Deut. Chem. 25, 1776–1787 (1892).
V. Auwers: Ann. 415, 213 (1918).